United States Patent [19]

Tupper

[11] 4,446,414
[45] May 1, 1984

[54] TERMINAL VOLTAGE LIMIT REGULATOR FOR A LOAD COMMUTATED INVERTER

[75] Inventor: Leland C. Tupper, Schenectady, N.Y.
[73] Assignee: General Electric Company, Salem, Va.
[21] Appl. No.: 322,741
[22] Filed: Nov. 19, 1981
[51] Int. Cl.³ .............................................. H02P 5/40
[52] U.S. Cl. .................................... 318/723; 318/812
[58] Field of Search ............... 318/798, 806, 722, 728, 318/807–812; 363/57, 58

[56] References Cited

U.S. PATENT DOCUMENTS

| | | | |
|---|---|---|---|
| 3,601,674 | 8/1971 | Joslyn et al. | 318/318 |
| 3,819,992 | 6/1974 | Opal et al. | 318/722 |
| 4,230,979 | 10/1980 | Espelage et al. | 318/721 |
| 4,237,531 | 12/1980 | Cutler et al. | 318/798 |
| 4,263,557 | 4/1981 | Jarvinen | 318/341 |
| 4,276,505 | 6/1981 | Bose | 318/723 |

Primary Examiner—David Smith, Jr.
Attorney, Agent, or Firm—Arnold E. Renner; Ormand R. Austin

[57] ABSTRACT

A control system for a load commutated inverter AC synchronous motor drive provides an operational shift in the event of an increase in motor terminal voltage $V_{TERM}$ above a preselected reference level. Under such an increase in terminal voltage, control is transferred from a condition where torque is controlled by current and the terminal voltage is uncontrolled to a condition where the load current, e.g., the DC link current $I_L$ flowing between a source side thyristor converter (AC to DC) 12 and a load side thyristor inverter (DC to AC) 14 is utilized to control the motor terminal voltage while the firing angle of the thyristor inverter 14 is used to control the motor torque. This involves increasing the minimum load or motor drive current for a desired torque while adjusting the inverter firing angle from a previous value, so that the desired torque is provided at a higher current $I_L$ and lower terminal voltage $V_{TERM}$ than before. Such an operational shift, in effect, uses a component of the load current to demagnetize the motor field in order to maintain the motor terminal voltage at an acceptable level.

13 Claims, 3 Drawing Figures

TERMINAL VOLTAGE LIMIT REGULATOR FOR A LOAD COMMUTATED INVERTER

REFERENCED MATERIAL

Reference is made to a microfiche appendix which sets forth a computer program listing including that which is applicable to the present invention. Included are 8 microfiche containing a total of 458 frames.

BACKGROUND OF THE INVENTION

This invention relates generally to firing circuits for thyristor power conversion systems and more particularly to an improved means for controlling the operation of an alternating current (AC) motor drive system including an electrical load such as an AC synchronous motor supplied from a polyphase alternating current source.

Many circuits and systems are known for controlling the conductivity of controlled rectifiers utilized in various types of converters for supplying electrical power to a load, such as an AC motor, from a polyphase AC source. The type of rectifier used will, of course, control to some degree the type of control utilized but by far the most common controlled rectifier used today is a thyristor of the silicon controlled rectifier type. The thyristor becomes conductive with the simultaneous application of a forward bias voltage and a signal applied to its gate electrode and thereafter remains conductive until the anode current falls below the value required to hold the thyristor in the conductive state.

With respect to a load commutated inverter for a three phase (3$\phi$) AC motor drive, the line to line voltage is a function of the motor's back electromotive force (emf) which acts to commutate the inverter thyristors once the synchronous motor exceeds a predetermined low value of speed. Control of the inverter supplying the synchronous motor, furthermore, is normally based upon the desire to fire the thyristors as late as possible. To "fire as late as possible" is to render the thyristors conductive at the commutation limit points, i.e. at a power factor angle just sufficiently leading to provide the volt-seconds necessary to safely commutate the current transfer from one thyristor to the other in a manner well known to those skilled in the art.

It should also be pointed out that whereas motor control systems employing thyristors have been implemented using analog control techniques, a typical example being U.S. Pat. No. 4,230,979, entitled "Controlled Current Inverter And Motor Control System", Paul M. Espalage, et al., Oct. 28, 1980, attention has also been directed to digital type of control techniques, examples of which are disclosed for example in: U.S. Pat. No. 3,601,674, "Control System For Firing SCR's In Power Conversion Apparatus", John A. Joslyn, et al., issued on Aug. 24, 1971; U.S. Pat. No. 4,263,557, "Power Converter Control", Willard B. Jarvinen, issued on Apr. 21, 1981; and U.S. Pat. No. 4,276,505, "Microcomputer—Based Control Apparatus For A Load—Commutated Inverter Synchronous Machine Drive System", Bimal K. Bose, issued on June 30, 1981. The teachings of these patents are specifically intended to be incorporated herein by reference for enabling one skilled in the art to understand the present invention without the disclosure of extraneous and irrelevant material.

It should also be pointed out that one characteristic of a synchronous AC machine, and more particularly a synchronous motor, is that its terminal voltage at any given value of field excitation is very sensitive to the load current when the motor is not tied to a nominal fixed voltage bus. This fact is of particular significance when the motor is driven by a variable current source such as an inverter, for example, as disclosed in the aforementioned Bose patent. Under these circumstances, particularly when operating near rated load conditions, a small drop in load current can result in an appreciable rise in terminal voltage, i.e. the voltage appearing across the motor from the inverter. This increase in terminal voltage may be unacceptably high in certain instances as seen by the inverter and/or the motor which in certain instances can have catastrophic effects.

SUMMARY OF THE INVENTION

It is an object of the present invention, therefore, to provide an improved system for controlling the power applied to an AC load.

It is another object to provide an improved system for controlling the power applied to an AC motor load.

It is a further object of the present invention to provide an improved system for controlling the power applied to an AC motor by means of a load commutated inverter.

Still a further object of the invention is to provide an inverter for supplying an AC synchronous motor in a manner to maximize the torque per ampere output of the motor until a voltage limit is reached, after which the motor is operated in a manner to limit its terminal voltage.

The foregoing and other objects are achieved in accordance with the present invention through the provision of an improved motor drive system comprised of a load commutated inverter employing a plurality of sequentially fired thyristors preferably in the form of a bridge which is adapted to supply AC current of a predetermined amplitude and frequency to an AC synchronous motor load from a polyphase AC source via an intermediate polyphase AC to direct current (DC) converter and a DC link circuit. Through the establishment of a torque reference signal, a current reference signal and a firing angle signal are generated to respectively control the DC current in the link circuit and to control the firing angle of the inverter. In the event of an increase in motor terminal voltage above a predetermined reference level, control is transferred to a condition where the DC current in the link, which corresponds to the motor drive current, is used to control the motor terminal voltage while the firing angle of the inverter is used to control the motor torque. This involves increasing the minimum load or motor current for a desired torque while adjusting the inverter firing angle so that the desired torque is provided at a higher current but at a lower terminal voltage, the latter resulting from the increased motor current acting to demagnetize the motor field.

BRIEF DESCRIPTION OF THE DRAWINGS

While the present invention is described in particularity for providing a basis for the claims annexed to and forming a part of this specification, a better understanding of the invention can be had by reference to the following description taken in conjunction with the accompanying drawings in which:

DESCRIPTION OF THE PREFERRED EMBODIMENT

Figure 1:
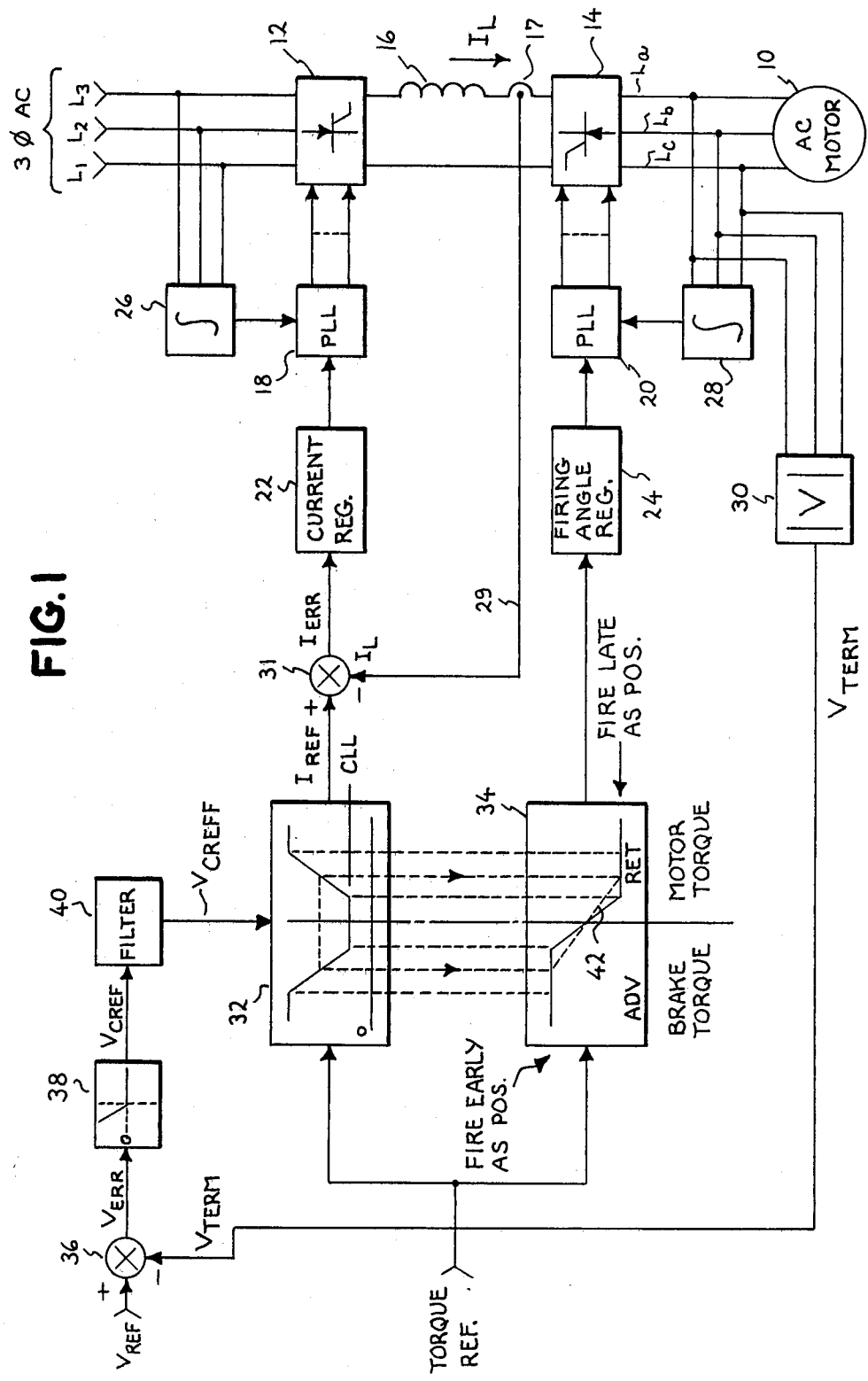
FIG. 1 is a block diagram illustrative of an AC motor drive system incorporating the present invention.

Referring now to FIG. 1, there is illustrated in block diagram form an AC motor drive system for controlling an AC motor load 10, and more particularly a synchronous motor, from a three phase (3∅) alternating current power source coupled to line terminals $L_1$, $L_2$ and $L_3$ in accordance with the operation of an AC to DC source side converter unit 12 and a DC to AC load side converter 14, hereinafter referred to as the inverter. The source side converter unit 12 operates to convert the three phase AC power into a source of variable DC current which is coupled by way of a DC link circuit including an inductor 16 to the inverter 14, which in turn operates to generate an AC current of variable magnitude and frequency which is supplied to the motor 10 by means of the three phase lines $L_a$, $L_b$ and $L_c$. The system up to this point includes the same basic power components as set forth in the aforementioned Bose U.S. Pat. No. 4,276,505.

Both the converter 12 and the inverter 14 are implemented by means of well known phase controlled thyristor bridge circuits, not shown, whose conductivity is controlled by some suitable means such as respective phase locked loop (PLL) firing control circuits 18 and 20. The firing angles of the thyristors in converter 12 are primarily controlled by the output of a current regulator 22 while the firing angles of the thyristors in the inverter 14 are primarily controlled by the output of a firing angle regulator 24.

The firing of the thyristors of the two units 12 and 14, moreover, is synchronized with the respective three phase line voltages $L_1$, $L_2$, $L_3$ and $L_a$, $L_b$, $L_c$ and typically utilize a waveform comprising the integration of the AC line to line voltage, the zero crossings of which are used to form a synchronizing pulse train having a frequency six times the fundamental frequency, i.e. the line frequency. The phase locked loop firing control circuits 18 and 20 are preferably of the digital type, a typical example of which is shown and described in the above-mentioned U.S. Pat. No. 4,263,557, by W. B. Jarvinen. Suitable integration circuitry for the phase lock loops 18 and 20 is provided by circuit means 26 and 28 and comprises circuitry shown and described, for example, in U.S. Pat. No. 4,399,395 by Paul M. Espelage entitled, "Line-to-Line Voltage Reconstruction For Synchronizing Thyristor Power Converter", issued Aug. 16, 1983 which patent is also specifically incorporated herein by reference.

The control system of the present invention operates in response to the sensed terminal voltage $V_{TERM}$ of the motor 10 following the application of a torque reference signal generated in a well known manner. A typical example of the manner in which the torque reference signal is generated is shown and described in the aforementioned Espelage U.S. Pat. No. 4,230,979. The terminal voltage can be derived by any number of well known ways, but for purposes of illustration, an absolute value detector circuit 30 is shown in FIG. 1 coupled to three lines $L_a$, $L_b$ and $L_c$ coupled between the inverter 14 and the motor 10.

As has been noted earlier, the nature of a synchronous machine is that the terminal voltage $V_{TERM}$ at a given value of the motor field current is very sensitive to the load current when the machine is not tied to a nominally fixed voltage bus as in the case of this invention where the motor 10 is driven by a current source comprised of an inverter 14. Under such conditions, particularly when operating near rated load conditions of the motor 10, a small drop in load current can result in an appreciable rise in terminal voltage $V_{TERM}$. In absence of such an unacceptably high terminal voltage condition, the thyristors in the inverter 14 are fired as "late as possible" prior to the crossings of the phase voltages on lines $L_a$, $L_b$ and $L_c$ in order to effect commutation which, as is well known, takes both voltage and time to accomplish. This usually results in a power factor in the order of 0.9 leading.

Normally, variations in desired motor torque in a system of the type described are obtained by appropriate changes to the DC link current $I_L$ flowing through the inductor 16 between the converter 12 and the inverter 14. In the present invention, this is effected by a simple negative feedback control loop 29 wherein the link current $I_L$ which also corresponds to the motor current is compared against a current reference signal $I_{REF}$ at a summing junction 31 with the link or motor current $I_L$ being derived from a current sensor 17 connected in series with the inductor 16. If, however, this form of operation results in an undesirably high motor terminal voltage $V_{TERM}$, this invention provides an operational shift wherein control is transferred to a form where the link current is used to control motor terminal voltage and the firing angle of the inverter 14 is used to control the torque. This involves an implementation of a current limiting function for the current regulator 22 and a change in the thyristor firing strategy of the firing angle regulator 24 now to be described.

As shown in FIG. 1, the torque reference signal representing desired motor torque is supplied from an external source, not shown, and is applied to two separate functional blocks 32 and 34 which are adapted to respectively generate a current reference signal $I_{REF}$ and to command an appropriate thyristor firing strategy as will be explained. Both of these functions have been implemented in software on an Intel 8086 microcomputer, using a PLM86 language as will be described with respect to FIGS. 2 and 3 and as evidenced by the program submitted herewith in microfiche form; however, when desirable they may be implemented in hardware as illustrated in FIG. 1 and which is helpful in understanding the invention. The functional block 32 indicates that during either the braking or motoring mode, the current reference $I_{REF}$ output is directly proportional to the torque reference input up to an upper limit and down to lower current limit CLL as defined below. The linear range between the upper and lower limits of the motoring mode is accompanied by a "fire as late as possible" firing strategy as commanded from the block 34; however, when operating on the lower current limit CLL, the firing angle regulator strategy is modified by advancing the firing angle.

In the braking mode the linear range between the upper and lower limits is accompanied by a "fire as early as possible" firing strategy; however, when operating on the lower current limit CLL, the firing angle regulator strategy is modified by retarding the firing angle. As used herein, "fire as early as possible" means firing the inverter thyristors at the proper times to achieve maximum braking voltage for the motor. The lower current limit CLL while having a non-zero minimum value, is furthermore adapted to be increased in accordance with a signal ($V_{CREEF}$) in the event that the terminal voltage $V_{TERM}$ across the motor 10 exceeds a preselected reference voltage level $V_{REF}$ representing the maximum voltage desired for proper equipment protection.

As shown in FIG. 1, the reference voltage $V_{REF}$, furnished from an external source, not shown, and the terminal voltage $V_{TERM}$ are compared (differenced) at a summing point 36. An error voltage $V_{ERR}$ is produced and is coupled to a block 38 which functions to provide a positive output signal only for a negative input, i.e., $-V_{ERR}$ meaning that the terminal voltage $V_{TERM}$ exceeds the reference $V_{REF}$. In the event of a negative error voltage $V_{ERR}$, a positive control output signal $V_{CREF}$ is provided which is directly proportional to the magnitude of the negative error signal $V_{ERR}$. The control signal $V_{CREF}$ is filtered at 40 to reduce electrical noise from the voltage measurement and to improve the stability of the control signal $V_{CREF}$. Both functional blocks 36 and 38 as well as the summing point 36 are implemented in software in the same microcomputer along with the functional blocks 32 and 34. An increase of the lower current limit CLL in response to the filtered control signal $V_{CREFF}$ is accompanied by a change in the point at which a shift in firing strategy is made, in the motoring mode, from a "fire as late as possible" strategy to a strategy of controlling motor torque by controlling firing angle as shown by reference numeral 42. In the braking mode the shift is similar with the exception that it is from a "fire as early as possible" to a strategy of controlling motor torque by controlling firing angle. The result is to increase the minimum $I_{REF}$ and motor current $I_L$ while generating the required torque at higher current; however, the terminal voltage $V_{TERM}$ is lower than previously due to the demagnetizing effect of the increased motor current on the field. Thus raising the minimum current reference CLL forces the main torque regulating system to operate at a larger current and lower power factor than it would otherwise.

Accordingly, when the system is operating with minimum motor current $I_L$, torque control is obtained by modifying the inverter's firing angle strategy; however, since minimum current is a variable in the function of error voltage $V_{ERR}$, the range of torque available from "fire as late as possible" to "fire as early as possible" is a function of the minimum current CLL. In summary, the essential elements of controlling voltage in a load commutated inverter according to the subject invention includes the concept of increasing the motor load current in the motoring mode beyond the minimum necessary to maintain the required torque and then adjusting the inverter firing angle by an amount necessary to regulate torque.

As indicated above, the implementation of the functional blocks 20 through 40 is preferably accomplished by digital computer apparatus.

Figure 2:
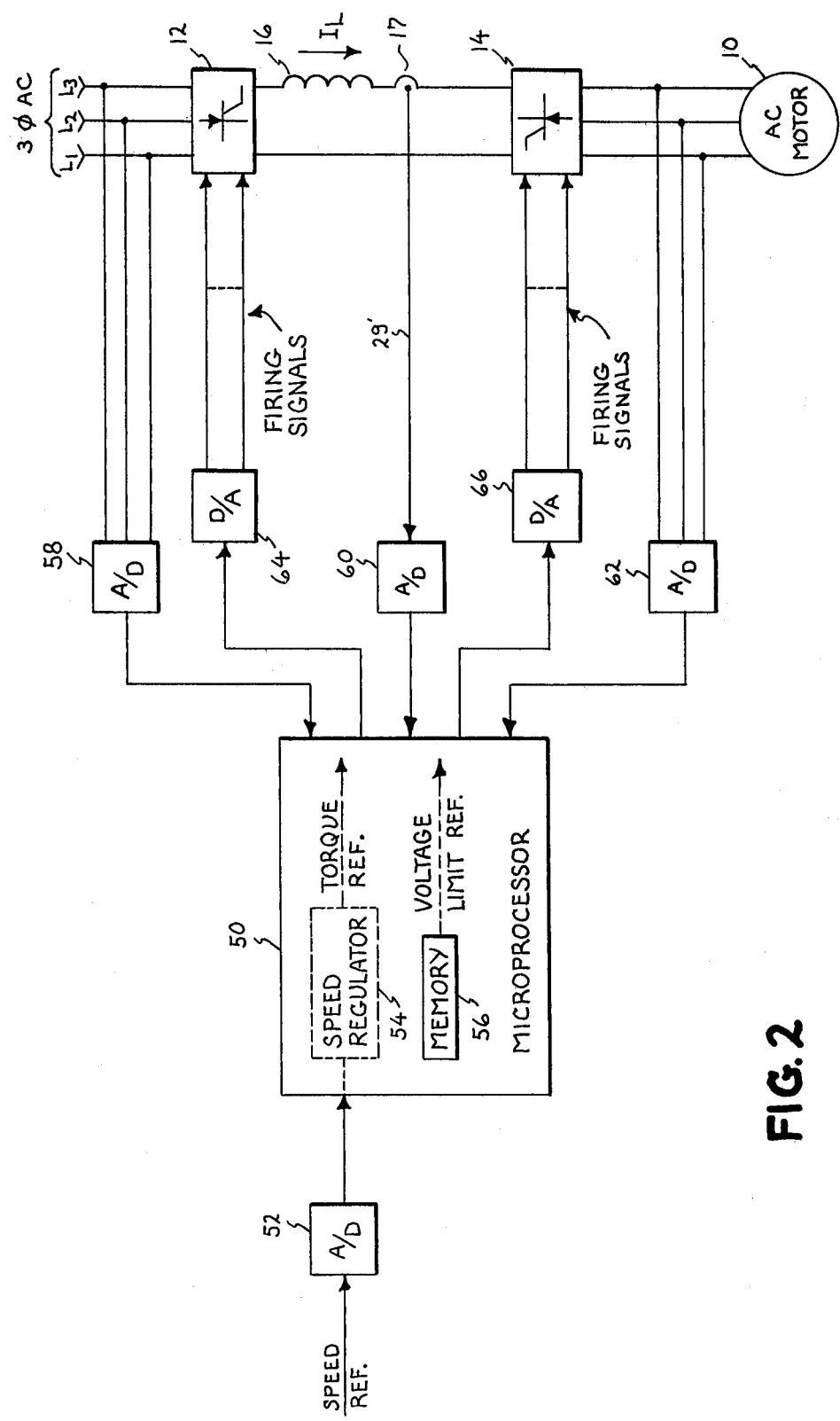
FIG. 2 is a block diagram illustrating the implementation of the present invention by a microprocessor.

FIG. 2 illustrates in block diagram form the basic implementation of the present invention using a microprocessor. As shown, a speed reference signal is furnished from a suitable source, not shown, to a microprocessor 50 by way of an analog to digital (A/D) converter 52. The speed reference signal is shown as being originated as an analog signal as from, by way of example, an operator settable rheostat. If the speed reference were originally presented in digital form, the A/D converter 52 would not, of course, be necessary. The microprocessor employed in the present invention may be any of those suitable for control applications but in actual practice comprises, as earlier indicated, an Intel 8086 programmed in PLM86 language. As a part of its functions, the microprocessor generates the torque reference signal of FIG. 1 using the speed reference signal as indicated by the dash line block 54. The voltage limit reference shown in FIG. 1 is shown in FIG. 2 as being derived from the contents of a memory location 56.

Microprocessor 50 receives inputs from and provides outputs to the power circuitry which is shown identically to that illustrated in FIG. 1. That is, the three power lines $L_1$, $L_2$ and $L_3$ supply a source side converter 12 which is connected to a load side converter 14 by way of a DC link circuit including an inductor 16 and a current sensor 17. The load side converter 14 furnishes power to the motor 10 by way of lines $L_a$, $L_b$ and $L_c$.

Synchronization information for the source side converter 12 is furnished by a suitable A/D converter 58 which is connected to the lines $L_1$, $L_2$ and $L_3$. The current feedback loop 29 of FIG. 1 is here shown as a loop 29' which includes an A/D converter 60 connected to the current sensor 17. Connected to the lines $L_a$, $L_b$ and $L_c$ is an additional A/D converter 62 which provides to microprocessor 50, the $V_{TERM}$ signal as well as a speed feedback signal which can be derived from the frequency of the motor terminal voltage in a manner well known in the art. The speed feedback signal is used in conjuction with the speed reference signal by the microprocessor to drive the torque reference signal.

Microprocessor 50 employs these various input signals in the functional manner described with respect to FIG. 1 and provides suitable outputs to control the thyristors of the converters 12 and 14. In FIG. 2 this is illustrated as outputs provided, respectively, to two digital to analog (D/A) interfaces 64 and 66 which provide the necessary firing signals to the converters 12 and 14.

Figure 3:
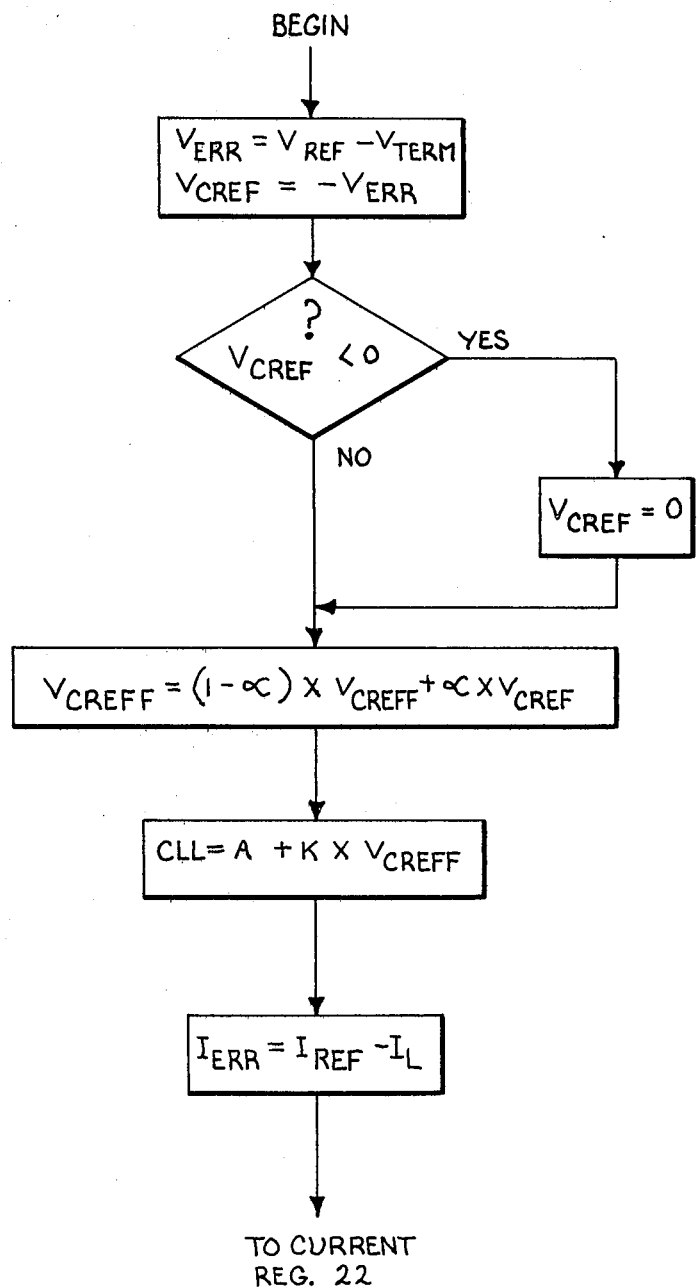
FIG. 3 is a flow chart illustrative of the software for implementing the terminal voltage regulator function according to the subject invention.

The software required is represented by the flow chart shown in FIG. 3. As shown, when the routine begins, the error signal $V_{ERR}$ is defined as the difference between the reference voltage $V_{REF}$ and the measured terminal voltage $V_{TERM}$. The correction signal $V_{CREF}$ is simultaneously defined as any negative value of the voltage error signal $V_{ERR}$. Following this, a query is made as to whether the correction signal $V_{CREF}$ is less than zero. If it is, then the value is set equal to zero. If the value of $V_{CREF}$ is not equal to zero, then its value is filtered by applying a simple first order lag filter correction to successive values of the filtered signal $V_{CREFF}$ by the function $[(1-\alpha) \times V_{CREFF} + \alpha \times V_{CREF}]$ wherein $\alpha$ is a stability related constant determined by the equipment parameters and the computer sampling rate. The filtered value $V_{CREFF}$ next redefines the minimum current reference CLL as $A + K \times V_{CREFF}$ wherein A and K are constants representing, respectively, a minimum desired motor current and the gain of the voltage limit regulator. Following this the current reference signal $I_{REF}$ is generated and compared against the motor load current $I_L$ with the difference signal therebetween used to control the current regulator 22 for firing the converter 12 in a well known conventional manner.

While there has been shown and described what are at present considered to be the preferred embodiments of the present invention, modifications thereto will readily occur to those skilled in the art. It is not desired, therefore, that the invention be limited to the specific methods and logic structure shown and described, but it is intended to cover all such modifications, changes and alterations as fall within the true spirit and scope of the invention as defined in the appended claims.

I claim:

1. A method of controlling an AC motor load driven by a thyristor inverter which supplies a load current of varying magnitude and frequency to said motor load, comprising the steps of:
   (a) varying the motor load current and the thyristor inverter firing angle according to a first firing angle strategy in response to a torque reference signal generated for a desired motor torque, said first firing angle strategy being that of firing at the commutation limit point and controlling motor torque as a function of motor current;
   (b) sensing the terminal voltage of the motor load;
   (c) comparing said terminal voltage against a preselected reference voltage; and
   (d) in the event that said terminal voltage exceeds said reference voltage, increasing the minimum motor load current and changing the firing angle strategy from said first strategy to a second firing angle strategy, said second firing angle strategy acting to regulate motor load current to the desired minimum load current and controlling motor torque by controlling the thyristor firing angle.

2. A method of controlling an AC synchronous motor driven by a DC to AC thyristor converter coupled to an AC to DC thyristor inverter via a DC link circuit comprising the steps of:
   (a) varying the motor load current and the thyristor firing angle of the inverter according to a first firing angle strategy in response to a torque reference signal indicative of a desired motor torque, said first firing angle strategy being that of firing at the commutation limit point and controlling motor torque as a function of motor current;
   (b) sensing the terminal voltage of the synchronous motor;
   (c) comparing the terminal voltage against a preselected reference voltage; and
   (d) in the event that said terminal voltage exceeds said reference voltage (i) increasing the motor load current to demagnetize the field of the synchronous motor and thus reduce the terminal voltage and (ii) adjusting the firing angle of said thyristor inverter according to a second firing angle strategy so that the required torque is provided by said second firing angle strategy but at a lower terminal voltage.

3. The method as defined in claim 2 wherein said first firing angle strategy comprises a "fire as late as possible" firing angle strategy for a motoring mode and a "fire as early as possible" firing angle strategy for a braking mode and wherein said second firing angle strategy comprises a shift in firing angle from said first firing angle strategy.

4. The method as defined by claim 3 wherein said step of controlling the motor load current comprises controlling the motor current by changing the DC link current through operation of said AC to DC converter.

5. The method as defined by claim 4 wherein said AC to DC converter is controlled by a current reference signal which has a controlled lower limit, said lower limit being controlled by the amount that the terminal voltage exceeds the reference voltage and wherein said lower limit determines said altering of the firing angle of said inverter to said second firing angle strategy.

6. The method as defined by claim 5 wherein the lower current limit is raised from a minimum value as a function of an error signal, said error signal being defined as the difference between a preselected reference voltage and said terminal voltage.

7. Apparatus for controlling an AC motor drive system supplying power of a variable current magnitude and frequency to an AC motor in response to a desired torque, comprising:
   (a) means for providing a controlled variable DC current source for providing a DC output which varies in magnitude in response to a first control signal applied thereto;
   (b) a source of variable frequency AC current including a thyristor controlled inverter for supplying a drive current to said motor in response to a second control signal applied thereto;
   (c) circuit means connecting said DC current source to said thyristor controlled inverter;
   (d) means for controlling the motor drive current magnitude in response to the desired torque;
   (e) means for controlling the firing angle of the thyristor controlled inverter in response to the desired torque;
   (f) means for detecting the magnitude of the motor terminal voltage;
   (g) means for comparing the magnitude of the motor terminal voltage with a preselected reference voltage and providing an error signal; and
   (h) means responsive to said error signal and being operable, in the event the magnitude of said motor terminal voltage exceeds said reference voltage, to cause said means (d) for controlling motor current to increase the minimum value of motor current and to cause said means (e) for controlling the firing angle of said inverter to shift from a first type firing strategy at least toward a second type firing strategy, whereby a desired torque is produced while the increase in motor current causes a reduction in motor terminal voltage.

8. The apparatus as defined by claim 7 wherein said means (d) for controlling the motor current comprises current regulator means and wherein said variable DC current source (a) comprises a thyristor controlled AC to DC converter coupled to a polyphase AC source.

9. The apparatus as defined by claim 7 wherein said first type firing strategy of said thyristor controlled inverter comprises a "fire as late as possible" firing strategy for a motoring mode of operation and a "fire as early as possible" type firing strategy for a braking mode of operation and wherein said second firing strategy comprises a shift in the firing angle of said inverter from said first firing angle strategy.

10. The apparatus as defined by claim 7 wherein said means (h) to cause said motor current to increase comprises means providing a current reference signal directly proportional to the desired torque and having a lower limit value which increases in response to the magnitude of the error signal in the event the motor terminal voltage exceeds said reference voltage.

11. The apparatus as defined by claim 10 wherein said means (h) to shift said firing strategy comprises means responsive to the lower limit of said current reference signal for effecting said shift from a first type firing strategy toward a second firing strategy.

12. The apparatus as defined by claim 11 wherein said AC motor comprises a synchronous motor and said first type firing strategy comprises a "fire as late as possible" while still effecting commutation type of firing strategy in a motoring mode of operation and said shift comprises an advancement of the firing angle of said inverter.

13. The apparatus as defined by claim 11 wherein said AC motor comprises a synchronous motor and said first type firing strategy comprises a "fire as early as possible" while still effecting commutation type of firing strategy in a braking mode of operation and said shift comprises a retardation of the firing angle of said inverter.

* * * * *